United States Patent [19]

Takei

[11] Patent Number: 5,305,156
[45] Date of Patent: Apr. 19, 1994

[54] DIGITAL DATA STORAGE APPARATUS COMPRISING CIRCUIT FOR REDUCING READ ERRORS

[75] Inventor: Masao Takei, Hachioji, Japan

[73] Assignee: TEAC Corporation, Tokyo, Japan

[21] Appl. No.: 961,091

[22] Filed: Oct. 14, 1992

[30] Foreign Application Priority Data

Oct. 18, 1991 [JP] Japan .................. 3-298200

[51] Int. Cl.$^5$ .................. G11B 5/09; G11B 20/14; G11B 20/16
[52] U.S. Cl. .................. 360/40; 360/43
[58] Field of Search .................. 360/10.1, 53, 69, 70, 360/75, 77.03, 77.08, 78.01, 78.14, 97.01, 902, 22, 40, 43, 44, 67, 45, 46, 38.1; 307/351, 354; 328/115, 117

[56] References Cited

U.S. PATENT DOCUMENTS

| | | | |
|---|---|---|---|
| 3,735,372 | 5/1973 | Coccagna | 360/40 |
| 4,016,599 | 4/1977 | Sherer | 360/53 |
| 4,152,731 | 5/1979 | Henry | 360/43 |
| 4,634,896 | 1/1987 | Shrinkle | 328/117 X |

Primary Examiner—Donald Hajec
Assistant Examiner—Patrick Wamsley
Attorney, Agent, or Firm—Woodcock Washburn Kurtz Mackiewicz & Norris

[57] ABSTRACT

A hard disk drive is disclosed wherein data is so recorded on the disk that a transducer puts out a waveform having a positive peak followed by a negative peak for each bit representative of a logic one of the data. For eliminating the read error that will arise when the disk is accidentally magnetized on its track gaps or other regions which should have been left unmagnetized, a read circuit connected to the transducer is constructed to recreate the recorded data by detecting the negative peaks, instead of the positive peaks, of the transducer output waveform.

4 Claims, 7 Drawing Sheets

DIGITAL DATA STORAGE APPARATUS COMPRISING CIRCUIT FOR REDUCING READ ERRORS

BACKGROUND OF THE INVENTION

This invention relates generally to digital data storage apparatus and more specifically to a digital storage apparatus employing a hard or "fixed" magnetic disk as a data storage medium. Still more specifically, the invention pertains to a system in such apparatus for reducing errors in reading data on such storage media.

In rotating magnetic disk apparatus in general, the individual bits of information are recorded on the disk as a pattern of reversals of magnetization. The transducer on scanning the disk produces a forward voltage for each forward or north seeking magnetization and a negative voltage for each reverse or south seeking magnetization, thereby providing one cycle of alternating current for each logic one. The transducer puts out no voltage for the logic zero since this is represented by unmagnetized regions on the disk. Such output from the transducer is amplified and directed into a read circuit, which reconstructs the recorded data by detecting the peaks of the transducer output waveform.

A problem has heretofore been encountered in thus reading data on the magnetic disk. Noise magnetizations are accidentally created on those parts of the disk track which should have been left unmagnetized to represent the logic zero, as well as on interblock gaps and any other gap between groups of signals on the disk. Conventionally, read errors occurred in such cases because the read circuit misconstrued such noise magnetizations as the logic one.

SUMMARY OF THE INVENTION

The present invention seeks to minimize the noted read error heretofore encountered in retrieving information from the magnetic disk and like storage media and hence to enhance the reliability of data storage devices of the type under consideration.

Briefly, the invention concerns an apparatus of the kind having a transducer for data transfer with a record medium such as a rotating magnetic disk on which digital data is recorded in such a manner that, on reading the data, the transducer produces a waveform having a plurality of peaks for each bit representative of a logic one, or a logic zero, of the data. More particularly, the invention resides in a read error reduction system in such apparatus featuring a read circuit connected to the transducer for recreating the data on the basis of any but the first of the peaks of the output waveform of the transducer representative of each bit of the data.

When a noise magnetization exists on any part of the disk track which should have been left unmagnetized, the first peak of the transducer output waveform representative of the subsequently recovered data is very liable to be affected by the noise. The second and any following peaks, being more remote from the noise, are far less likely to be influenced by the noise. Read error is therefore much less likely to occur if the recorded data is reconstructed on the basis of the second or any subsequent peak, rather than the first, of the transducer output waveform.

As has been set forth in connection with the prior art, the output waveform of the transducer customarily has a positive peak followed by a negative peak for each logic one of the recorded data. In this case the read circuit can be constructed to recreate the data by detecting the negative peaks, instead of the positive peaks, of the waveform. The effects of a noise preceding a positive peak will then be eliminated.

The above and other features and advantages of this invention and the manner of realizing them will become more apparent, and the invention itself will best be understood, from a study of the following description and appended claims, with reference had to the attached drawings showing the closest prior art and the preferred embodiments of the invention.

DESCRIPTION OF THE PREFERRED EMBODIMENT

The invention will now be described in detail as embodied in the hard disk drive illustrated in FIG. 1. The disk drive has a hard magnetic disk 1 fixed to a hub 2 which is driven directly by an electric disk drive motor 3. The disk 1 has a multiplicity of, two shown, annular record tracks TR arranged concentrically on one of its major surfaces. Data is recorded on these tracks by a prescribed format.

A magnetic data transducer 5 is mounted to a distal end of a support arm 6 which is proximally coupled to an electric transducer positioning motor 4. Typically, the positioning motor takes the form of a known voice coil motor capable of transporting the transducer 5 across the tracks TR on the disk 1 and positioning the same on any desired one of the tracks in response to an energizing current. The transducer 5 is electrically coupled to a write circuit 7 on one hand and, on the other hand, to an amplifier circuit 8 having an automatic gain control built into it.

All the tracks TR on the disk 1 are divided into a plurality (e.g. forty three) of sectors, and each sector is subdivided into a servo subsector SV and a data subsector DS. The servo sector SV further conventionally resolves itself into a first gap, an AGC region, a second gap, a track data region, a tracking servo burst region, and a postamble region, arranged in that order.

Figure 7:
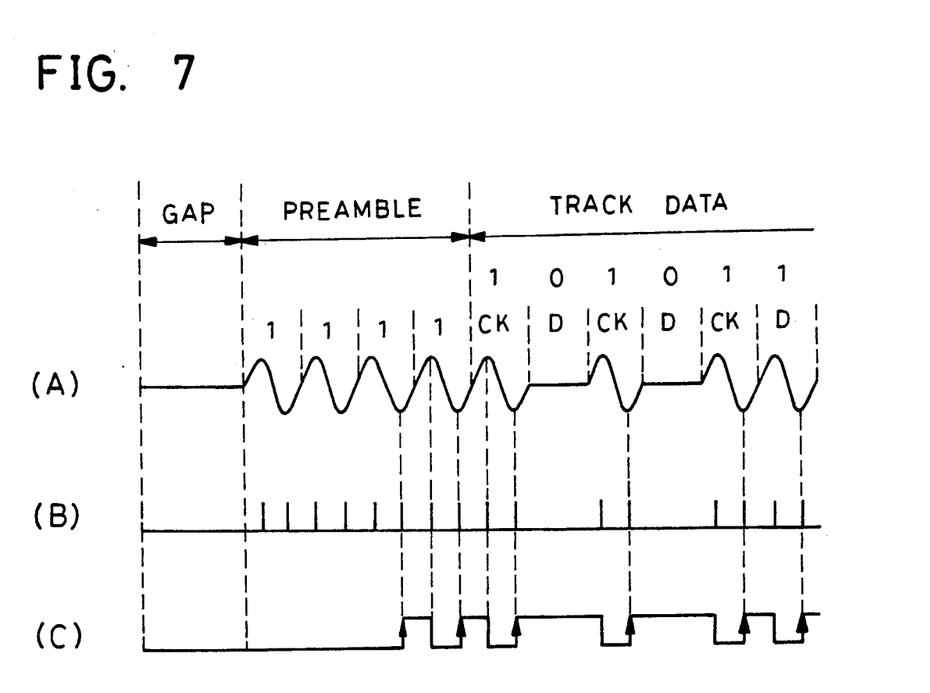
FIG. 7, consisting of (A) through (C), is a series of waveform diagrams useful in explaining the operation of the FIG. 1 disk drive.

At (A) in FIG. 7 is shown the output waveform from the amplifier circuit 8 which represents part of the track data region where a track address is recorded. Immediately after the second gap comes the preamble [1111]

followed by the track data D with noise guards CK which are recorded as the logic one.

With reference back to FIG. 1 the amplifier circuit 8 is of differential amplifier construction having two opposite phase output lines 9 and 10. Both output lines are connected to a read circuit 11, and the first output line 9 is additionally connected to a position signal generator circuit 12. The read circuit 11 responds to the incoming opposite phase waveforms from the amplifier circuit 8 by producing read pulses, for delivery to a controller 15 over a line 13 and further processes the read pulses for reproducing read data representative of the data that has been recovered from the disk 1. The read data is also sent to the controller 15 over a line 14. The read circuit 11 is shown in detail in FIG. 2, to which reference will be had presently.

The controller 15 relies on the read pulses for ascertaining the various control signals that have been retrieved along with the data. The controller 15 is further connected to the read circuit 11 by way of an output line 16 for applying thereto the known timing signal for reading the servo data. Still further the controller 15 is connected to a transducer positioning circuit 19 by way of another output line 18. Inputting a track command from a host system, not shown, over a line 17, the controller 15 delivers to the transducer positioning circuit 19 the known positioning signal necessary for positioning the transducer 5 over the desired track.

The transducer positioning circuit 19 has two other inputs connected to the position signal generator circuit 12 and to a transducer speed sensor 20, and an output connected to a motor driver circuit 21 and thence to the voice coil motor 4. The position signal generator circuit 12 provides a transducer positioning signal indicative of the current position of the transducer 5 over the disk 1, whereas the speed sensor 20 provides a transducer speed signal indicative of the traveling speed of the transducer 5. Relying on these input signals, the positioning circuit 19 conventionally functions to cause the driver circuit 21 to energize the voice coil motor 4 so that the transducer may be positioned over the track that has been specified by the host.

Figure 2:
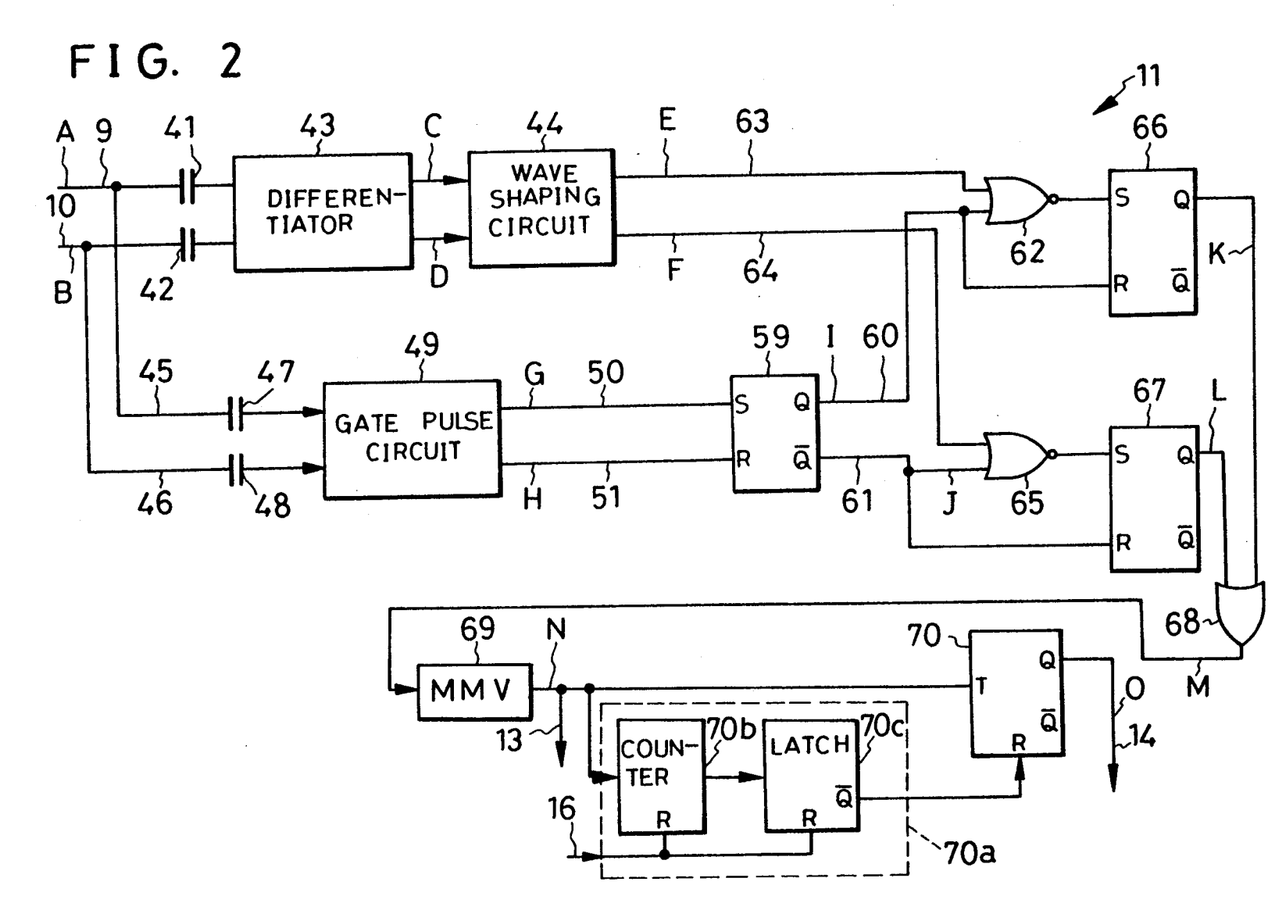
FIG. 2 is a block diagram showing in detail a read circuit included in the FIG. 1 disk drive.

Reference is now invited to FIG. 2 for the detailed discussion of the read circuit 11. Such discussion will be better understood by referring also to FIGS. 3 and 4, each showing at (A) through (O) the waveforms appearing in the correspondingly designated parts of the FIG. 2 circuit.

Figure 1:
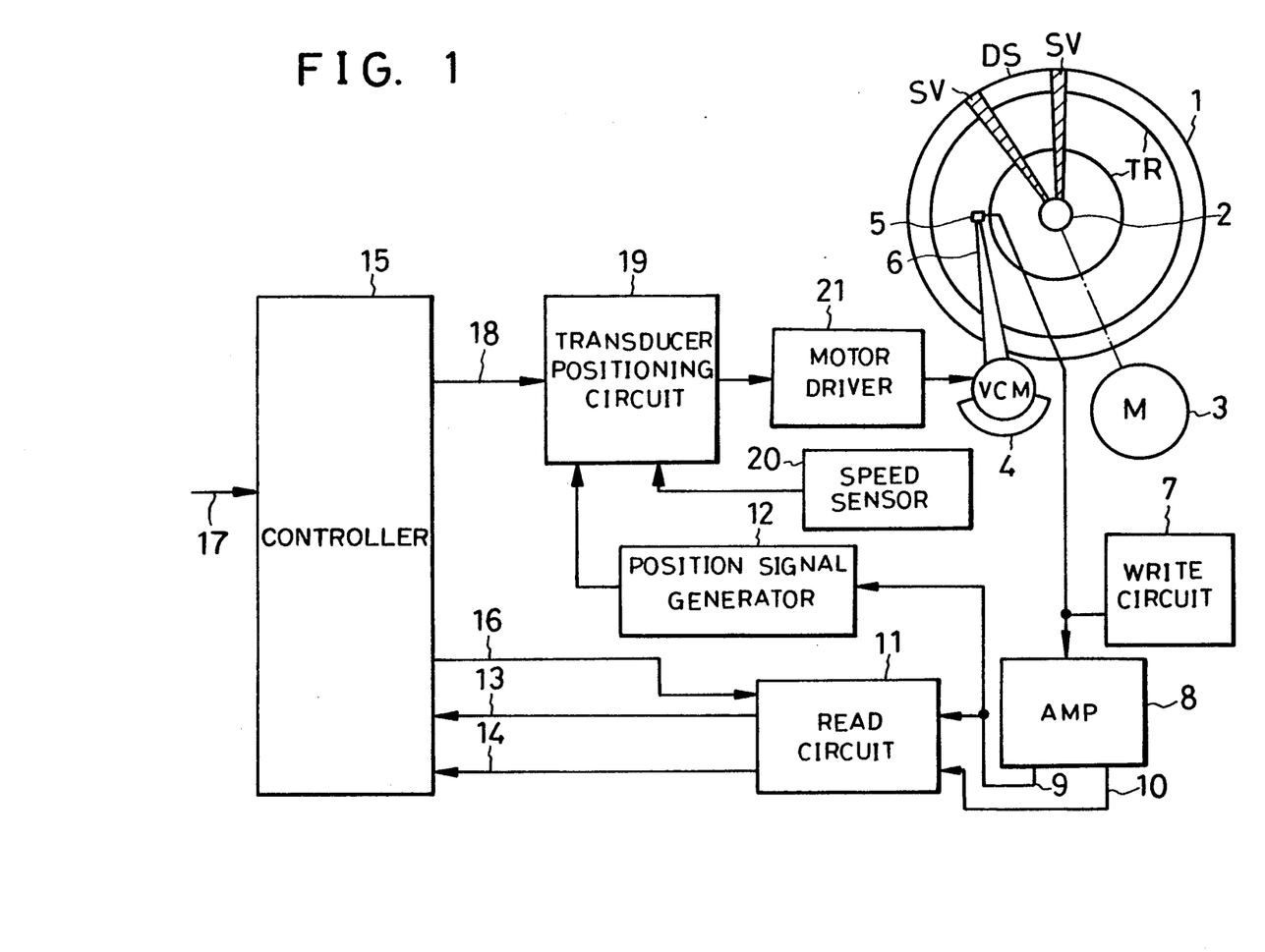
FIG. 1 is a block diagram of a hard disk drive incorporating the read error reduction system of this invention.

The read circuit 11 has a differentiator circuit 43 having two inputs connected to the pair of output lines 9 and 10 of the amplifier circuit 8, FIG. 1, via coupling capacitors 41 and 42, respectively. Assume that, as indicated at (A) and (B) in FIG. 3, the opposite phase amplifier outputs represent a noise guard signal followed by a logic one track identification signal. Then the corresponding outputs from the differentiator circuit 43 will be as shown at (C) and (D) in FIG. 3.

These outputs from the differentiator circuit 43 are directed into a differential wave shaping circuit 44. Comprising zero volt comparators, the wave shaping circuit 44 modifies the differentiator outputs into the rectangular waves shown at (E) and (F) in FIG. 3.

The pair of amplifier output lines 9 and 10 are also connected to a differential gate pulse circuit 49 by way of branch lines 45 and 46 having coupling capacitors 47 and 48. The gate pulse circuit 49 modifies the opposite phase amplifier outputs into the two series of gate pulses shown at (D) and (H) in FIG. 3. More will be said presently about the gate pulse circuit 49.

Figure 3:
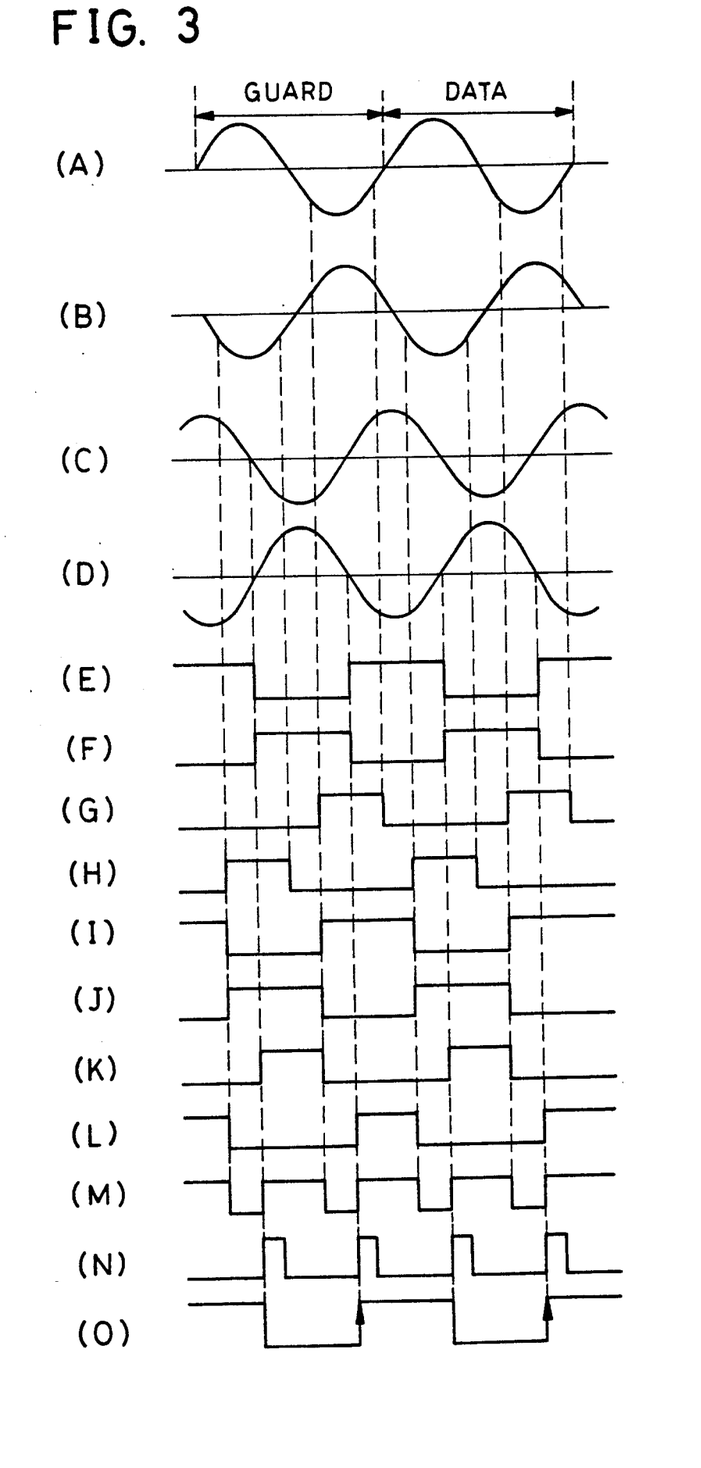
FIG. 3, consisting of (A) through (O), is a series of waveform diagrams useful in explaining the normal operation of the FIG. 2 read circuit.

The pair of output lines 50 and 51 of the gate pulse circuit 49 are connected to the set input S and reset input R, respectively, of an RS flip flop 59. Thus the flip flop 59 produces the two opposite phase pulse trains of FIG. 3(I) and (J) on its output lines 60 and 61.

The output line 60 of the flip flop 59 is connected to a NOR gate 62, the other input of which is connected to the output line 63 of the wave shaping circuit 44. The other output line 61 of the flip flop 59 is connected to a second NOR gate 65, the other input of which is connected to the output line 64 of the wave shaping circuit 44. The output of the first recited NOR gate 62 is connected to the set input S of a second RS flip flop 66. The reset input R of this flip flop is connected to the output line 60 of the first mentioned flip flop 59. The output of the second NOR gate 65 is connected to the set input S of a third RS flip flop 67, the reset input R of which is connected to the output line 51 of the first flip flop 59. The noninverting outputs Q of the flip flops 66 and 67 therefore provide the rectangular waves indicated at (K) and (L) in FIG. 3.

These outputs from the flip flops 66 and 67 are both directed into an OR gate 68. The resulting output from the OR gate 68 is as shown at (M) in FIG. 3. Connected to the output of the OR gate 68 is a monostable multivibrator (MMV) 69, which puts out the desired read pulses, as at (N) in FIG. 3, in response to the leading edges of the OR gate output pulses. The read pulses are sent as aforesaid to the controller 15, FIG. 1, over the line 13.

The output of the MMV 69 is connected to the trigger input T of a trigger flip flop 70. As indicated at (O) in FIG. 3, the Q output from the flip flop 70 alternately switches between two states in response to the leading edges of the read pulses. This output from the flip flop 70 is the read data, which is sent to the controller 15 over the line 14.

In the illustrated embodiment the read data pulses rise in synchronism with the negative peaks of the amplifier output of FIG. 3(A). In order to achieve this the output of the MMV 69 is additionally connected to a flip flop control circuit 70a, the output of which is connected to the reset input R of the flip flop 70. The flip flop control circuit 70a is shown as a serial connection of a counter 70b and a latch circuit 70c. The counter 70b counts the read pulses of FIG. 7(B) up to a predetermined odd number of, typically, five after the gap. The latch circuit 70c goes low when the counter 70b counts five read pulses. The output line 16 of the FIG. 1 controller 15 is connected to the reset inputs R of both counter 70b and latch circuit 70c for applying thereto a pulse representative of the FIG. 7 gap. Consequently, the flip flop 70 is held reset by the high output from the latch circuit 70c until the counter 70b counts the five pulses of FIG. 7(B) after the gap, inhibiting the delivery of the read pulses to the controller 15.

Figure 4:
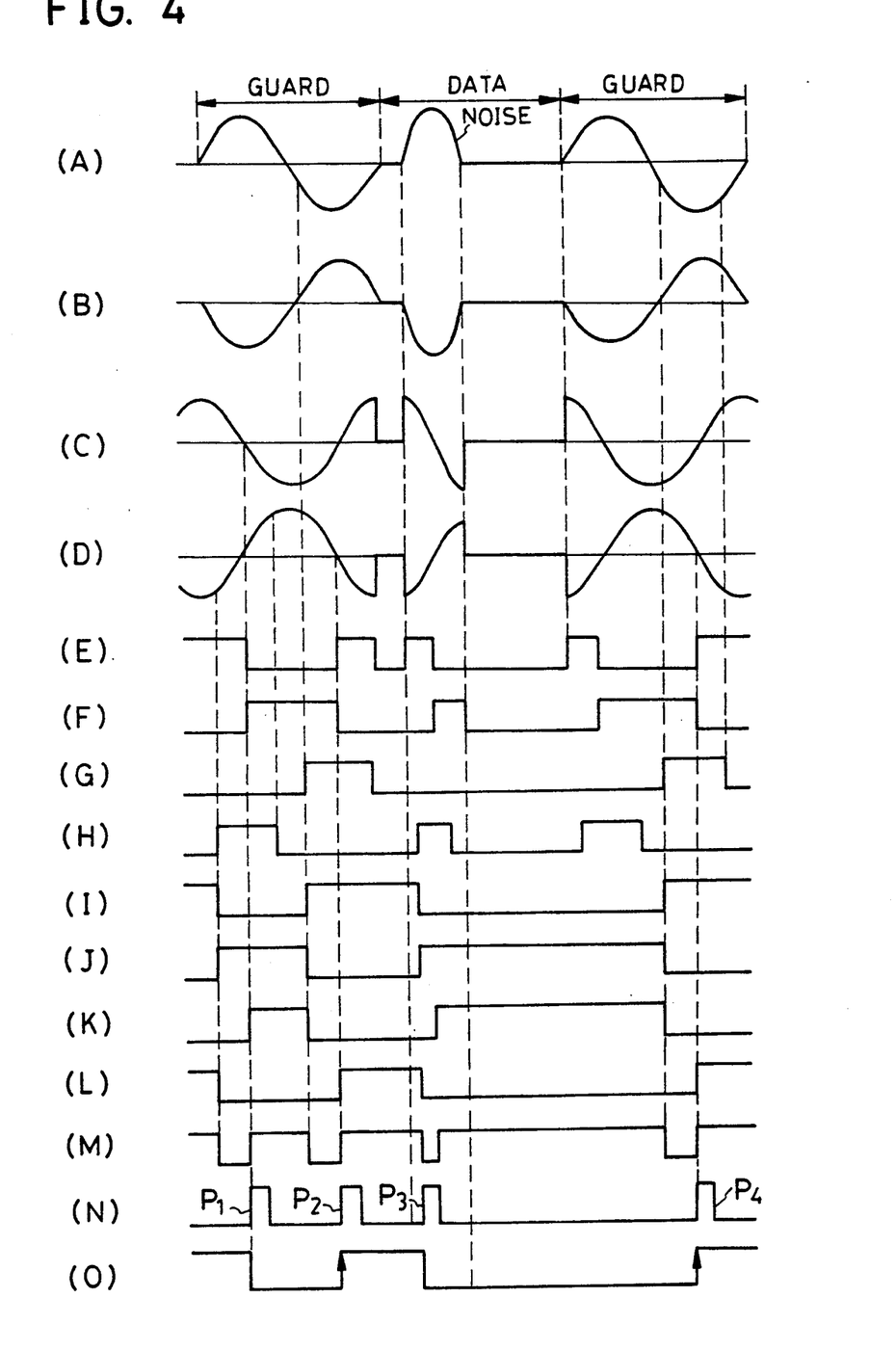
FIG. 4, consisting of (A) through (O), is a series of waveform diagrams similar to FIG. 3 but explanatory of the operation of the read circuit when a noise magnetization is encountered.

FIG. 4 is a series of waveform diagrams similar to FIG. 3 except that a noise exists at a track data region, which should have been left unmagnetized to present the logic zero, between two noise guards. In this case, too, as in the case depicted in FI 3, the two read pulses $P_1$ and $P_2$ will be generated as at (N) in FIG. 4 to represent the positive and negative peaks of the first noise guard. Another read pulse $P_3$ will then be generated to represent the noise on the track data region.

However, the read circuit 11 will not respond to the positive peak of the noise guard comes after the noise. This nonresponse is because the flip flop 66, FIG. 2, on the read circuit 11 will have been set by the noise and remain so until the negative half cycle of the next noise guard. No read pulse will therefore appear in response to the positive peak of the noise guard following the noise, so that all the data on the disk 1 will be read without being substantially affected by such noise.

Figure 5:
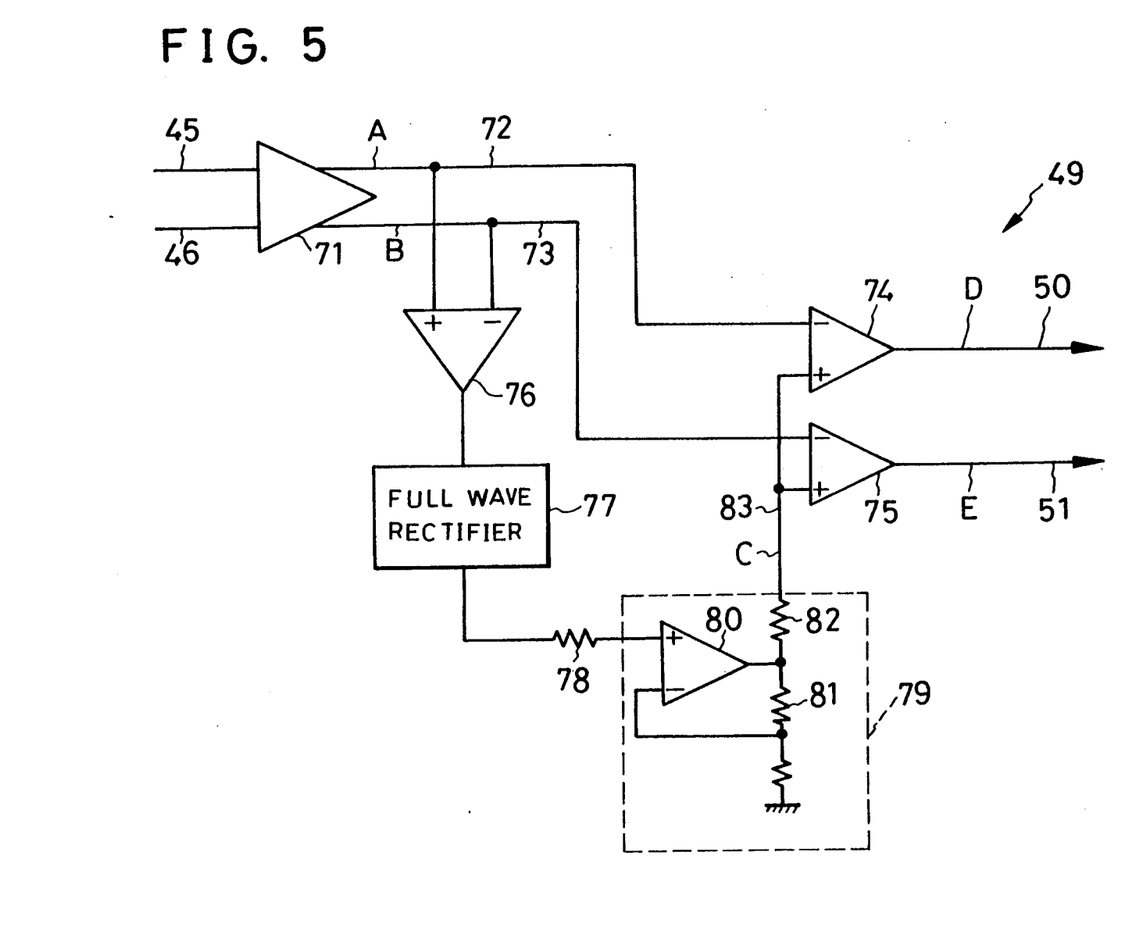
FIG. 5 is a detailed diagram of a gate pulse circuit included in the FIG. 2 read circuit.
Figure 6:
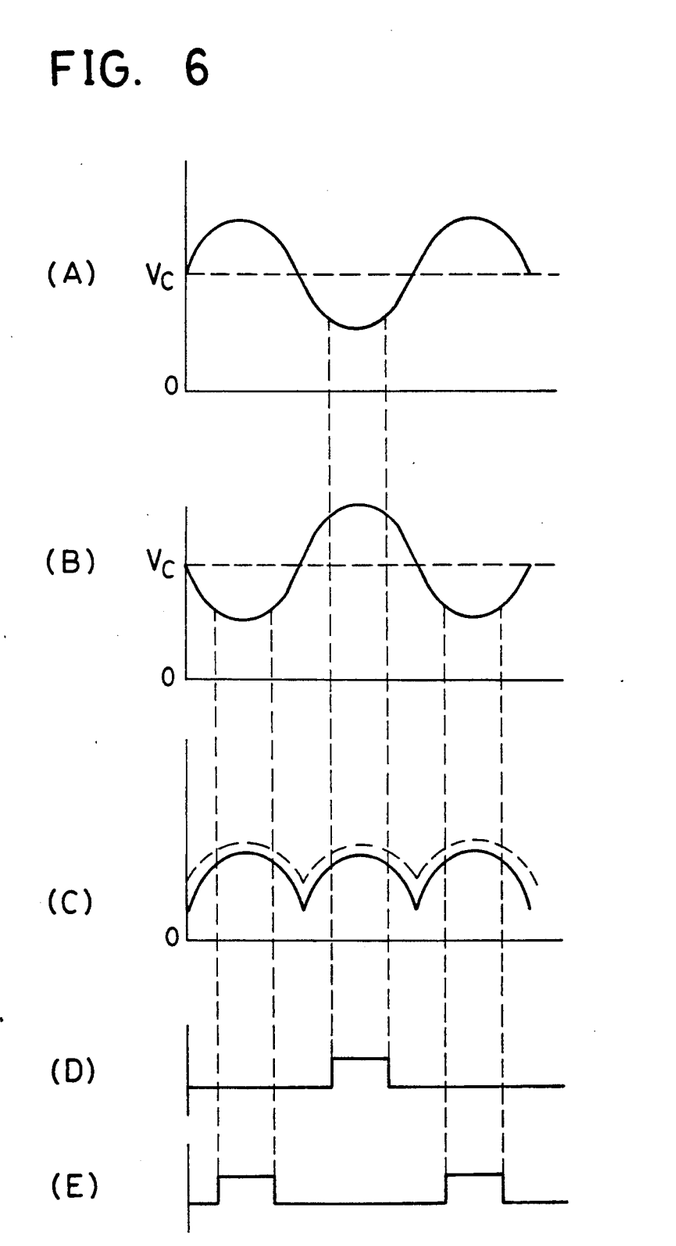
FIG. 6, consisting of (A) through (E), is a series of waveform diagrams useful in explaining the operation of the FIG. 5 gate pulse circuit.

FIG. 5 is a detailed illustration of the gate pulse circuit 49 included in the FIG. 2 read circuit. FIG. 6 shows at (A) through (E) the waveforms appearing in the correspondingly designated parts of the FIG. 5 circuit.

The pair of input lines 45 and 46 of the gate pulse circuit 49 are connected to a differential amplifier 71. The pair of differential output lines 72 and 73 of this differential amplifier are connected to a pair of comparators 74 and 75, respectively, and also to another differential amplifier 76. As the differential amplifier 71 provides the pair of opposite phase outputs shown at (A) and (B) in FIG. 6, with the same direct bias voltage Vc, the other differential amplifier 76 will put out a signal representative of the difference between the two inputs.

Inputting the output from the differential amplifier 76, a full wave rectifier circuit 77 delivers its output to a noninverting amplifier 79 via a resistor 78. The amplifier circuit 79 comprises an operational amplifier 80 and two resistors 81 and 82. The output produced by this amplifier circuit on its output line 83 is as depicted at (C) in FIG. 6. This output is directed into both comparators 74 and 75.

Thus the comparator 74 compares the FIG. 6(C) signal with the FIG. 6(A) signal whereas the other comparator 75 compares the FIG. 6(C) output with the FIG. 6(B) signal. The comparator 74 produces pulses on its output line 50, as shown at (D) in FIG. 6, when the FIG. 6(C) waveform is of greater magnitude than that of FIG. 6(A). The comparator 75 produces pulses on its output line 51, as shown at (E) in FIG. 6, when the FIG. 6(C) waveform is of greater magnitude that that of FIG. 6(B). The waveforms (D) and (E) in FIG. 6 correspond to those shown at (G) and (H) in FIG. 3.

Reference is directed again to FIG. 7 for a more detailed discussion of how the present invention succeeds in reducing read errors of the kind under consideration. At (A) in this figure is shown as aforesaid the amplified output from the transducer 5 which represents the track data on one of the servo sectors of the disk 1. Inputting this transducer output, the read circuit 11 will produce the read pulses of FIG. 7(B) on its output line 13 and the read data of FIG. 7(C) on its output line 14. The read pulses represent the positive and negative peaks of the transducer output. The beginning of the track data region is determined on the basis of the preceding gap.

In the read circuit 11, as has been set forth with reference to FIG. 2, the read data is produced by directing the read pulses into the flip flop 70. A study of FIG. 7 will reveal that the read data pulses at (C) rise in synchronism with those of the read pulses at (B) which correspond to the negative peaks of the pairs of positive and negative peaks of the transducer output at (A) which represent the logic one. All the logic ones in FIG. 7 are each represented by one cycle of alternating transducer output current, so that the second, fourth, sixth and like even number read pulses correspond to the negative peaks of the transducer output.

As has also been stated in connection with FIG. 2, the flip flop control circuit 70a applies to the reset input R of the flip flop 70 a signal for masking the first five read pulses following the preamble. Subsequently triggered by the sixth read pulse representative of one negative peak of the transducer output, the flip flop 70 goes high and then goes low in response to the next read pulse representative of the following positive peak of the transducer output. In track data regions and primary data regions, too, the flip flop 70 goes high in response to the second of each two read pulses representative of the logic one. Since positive peaks always precede negative peaks, the positive peaks serve to prevent the negative peaks from being affected by noise. More specifically, the positive peaks may be displaced if noise exists on the logic one regions preceding the positive peaks, but there is little likelihood of the negative peaks being affected by such noise. Accurate reading is possible as data is read by relying on the read pulse $P_4$, FIG. 4, which is independent of the read pulse $P_3$ due to the noise.

Despite the foregoing detailed disclosure, it is not desired that the present invention be limited by the exact details of the illustrated embodiment. A variety of modifications, alterations and adaptations of the invention will suggest themselves for those skilled in the art within the broad teaching hereof. For example, each noise guard could be recorded as two or more, instead of one, sets of opposite polarity magnetizations. Each bit of track identification data could also be represented by two or more, instead of one, cycles of alternating transducer output. In this case, the third or later, instead of second, one of the read pulses representative of one bit could be relied upon for reading in accordance with the invention. It will also be apparent that the invention could be applied to magneto-optic and other types of storages.

What is claimed is:

1. A digital data storage apparatus comprising:
   (a) a transducer for data transfer with a record medium on which digital data is recorded in such a manner that, on reading the data, the transducer produces a waveform having a positive peak followed by negative peak for each bit representative of one of a logic one and a logic zero of the data and puts out no voltage for the other of the logic one and the logic zero of the data; and
   (b) a read circuit connected to the transducer for recreating the one of the logic one and the logic zero of the data on the basis of the negative peak of the output waveform of the transducer representative of each bit of the one of the logic one and the logic zero of the data.

2. The digital data storage apparatus of claim 1 wherein the one of the logic one and the logic zero is the logic one, and wherein the other of the logic one and the logic zero is the logic zero.

3. A digital data storage apparatus comprising:
   (a) a transducer for data transfer with a record medium on which digital data is recorded in such a manner that, on reading the data, the transducer produces a waveform having a plurality of pairs of positive and negative peaks for each bit representative of one of a logic one and a logic zero of the data, and puts out no voltage for the other of the logic one and the logic zero of the data; and
   (b) a read circuit connected to the transducer for recreating the one of the logic one and the logic zero of the data on the basis of a peak in any but the first of the plurality of pairs of positive and negative peaks of the output waveform of the transducer representative of each bit of the one of the logic one and the logic zero of the data.

4. The digital data storage apparatus of claim 3 wherein the one of the logic one and the logic zero is the logic one, and wherein the other of the logic one and the logic zero is the logic zero.

* * * * *